United States Patent
Soffar et al.

[11] Patent Number: 6,125,480
[45] Date of Patent: Oct. 3, 2000

[54] VEHICLE MOUNTED TOILET SEAT

[76] Inventors: Randall Jay Soffar, 12808 McLennan Ave., Granda Hills, Calif. 91344; Mack Douglas Hopkins, 3001 W. 8th Ave., Corsicana, Tex. 75110

[21] Appl. No.: 09/184,857

[22] Filed: Nov. 3, 1998

[51] Int. Cl.$^7$ .............................. A47K 11/02; E04H 1/12
[52] U.S. Cl. ..................... 4/460; 4/449; 4/458; 4/483; 224/519; 224/521
[58] Field of Search ............................. 4/235, 237, 239, 4/449, 458, 460, 479, 483, 484, 420, 246.1; 224/519; 280/491.5, 460.1, 292

[56] References Cited

U.S. PATENT DOCUMENTS

| | | | |
|---|---|---|---|
| 1,142,249 | 6/1915 | Griffiths | 4/420 |
| 1,243,815 | 10/1917 | Collins | 4/420 |
| 2,772,402 | 12/1956 | Carter | 4/458 |
| 5,083,324 | 1/1992 | Strong | 4/460 |
| 5,232,133 | 8/1993 | Speer . | |
| 5,232,135 | 8/1993 | Marren . | |
| 5,285,937 | 2/1994 | Schmidt . | |
| 5,460,304 | 10/1995 | Porter et al. . | |
| 5,806,106 | 9/1998 | Carter et al. | 4/246.1 |
| 5,853,187 | 12/1998 | Maier | 280/491.5 |
| 5,881,937 | 3/1999 | Sadler | 224/521 |
| 5,909,968 | 6/1999 | Olin et al. | 4/420 |
| 6,023,792 | 2/2000 | Croucher et al. | 4/484 |

*Primary Examiner*—Henry J. Recla
*Assistant Examiner*—Tuan Nguyen
*Attorney, Agent, or Firm*—Hoffman Wasson & Gitler

[57] ABSTRACT

An extension member is attachable to a trailer hitch and extends away from the vehicle and is connected to a seating frame supporting a toilet seat. This extension member serves to provide distance between the toilet seat and the vehicle. The seating frame consists of a background which is perpendicular to extension member and two arms which extend from the back rail. The back rail and arms create a generally "U" shaped frame. In the top surface of the back rail are two mounting apertures. These apertures are 5½ inches apart which is the standard different distance of the two mounting bolts commonly found on standard toilet seats. The toilet seat can be used by hunters, fisherman, campers, construction workers, boaters and other people who find themselves away from conventional bathroom facilities.

10 Claims, 3 Drawing Sheets

VEHICLE MOUNTED TOILET SEAT

BACKGROUND OF THE INVENTION

Many outdoor activities takes people away from the comforts of civilization. People travel to remote areas in their cars and find themselves far from such comforts as electricity and plumbing. In the past, when one has found themselves with the need to use the bathroom while participating in outdoor activities, if limited to the use of self-standing and self-supporting portable toilets, or the nearest available bush. The drawbacks of such choices is the lack of weight, support and stability from current portable toilets, there sometimes limited availability, the unsanitary conditions which are often present, and the uncomfortable, awkward and sometimes messy method of going to the bathroom without the benefit of a portable toilet.

Many devices have been developed that allow somebody participating in outdoor activities to carry various articles to their ultimate destination by attaching the items to their car.

One such device is disclosed in U.S. Pat. No. 5,232,135 (Marren).

The device is a trunk top carrier that attaches to the trailer hitch of a car and has a holder consisting of horizontal bars. A cargo carrier is attached to the holder. Another device is disclosed in U.S. Pat. No. 5,285,937 (Schmidt). Schmidt discloses a cycle rack which connects to the ball trailer hitch. The cycle rack has two vertical members. Each vertical member has a horizontally extending rod for carrying a bicycle. U.S. Pat. No. 5,460,304 (Porter et al.) discloses a modular carrier system for attachment to vehicles. The system consists of a series of horizontal and vertical bars that are used to support any number of items such as a cargo carrier or a bicycle holder or a ski holder. The vertical bars have a rectangular cross section and are secured within a tubular trailer hitch 18 on a vehicle bumper. A portable table attachable to a trailer hitch is disclosed in U.S. Pat. No. 5,232,133 (Speer). The carrier for the table can also be configured to hold bicycles or skis.

It is an object of the invention to provide a frame which is attachable to a trailer hitch that can support a toilet seat.

It is another object of the invention to provide a toilet seat which can be attached to car and brought to the user's ultimate destination which may be remote from any bathroom facilities.

It is an object of the invention to provide a portable toilet seat attachable to vehicle which is easy to use and inexpensive to manufacture.

It is another object of the invention to provide a frame which can removably attach a toilet seat.

SUMMARY OF THE INVENTION

The invention consists of an extension member that is attachable to a trailer hitch and extends away from the vehicle. This extension member serves to provide distance between the toilet seat and the vehicle. Attached to the extension member is a seating frame. The seating frame supports the toilet seat and user during use. The seating frame consists of a background which is perpendicular to extension member and two arms which extend from the back rail. The back rail and arms create a generally "U" shaped frame. In the top surface of the back rail are two mounting apertures. These apertures are 5½ inches apart which is the standard different distance of the two mounting bolts commonly found on standard toilet seats. This vehicle mounting the toilet seat can be used by hunters, fisherman, campers, construction workers, military, boaters and other outdoor people who find themselves away from conventional bathroom facilities.

DETAILED DESCRIPTION OF THE INVENTION

Figure 1:
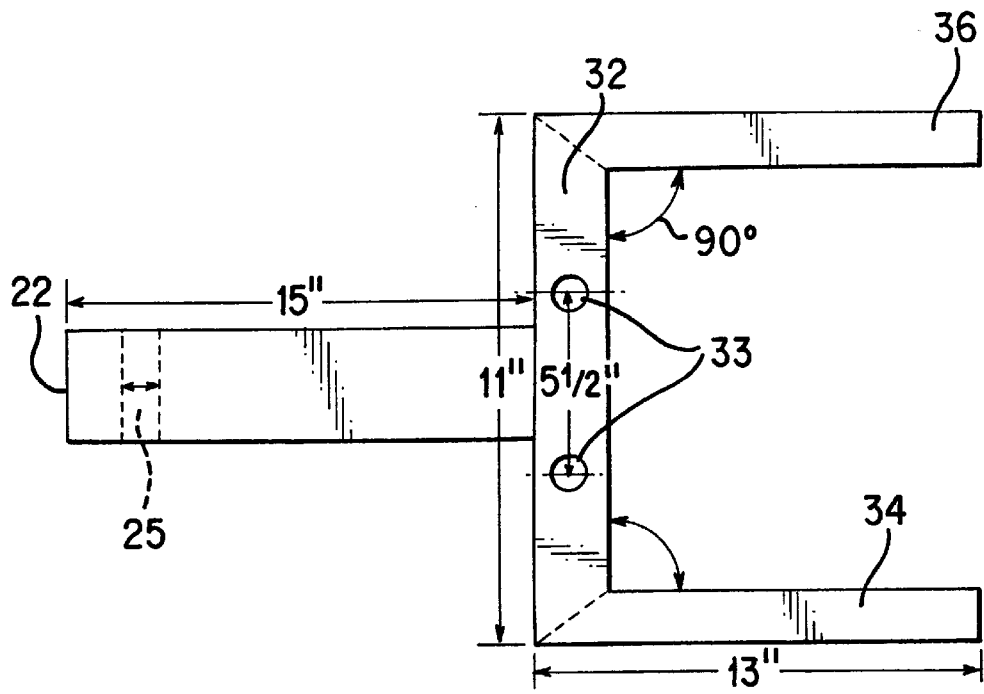
FIG. 1 is a top view of a first embodiment of the frame.

The frame of the invention can be seen in FIG. 1. The frame has an extension member 22 which extends outwardly from the bumper. A first end of the bumper has an aperture 25 which is extends through both sides of the extension member and is preferably located midway between the upper and lower surface. It is preferred that the diameter of the aperture be 0.625 inches. The aperture serves to secure the first end of the extension member to a female trailer hitch on a vehicle. The extension member is preferably 15 inches long. Connected to the extension member is the seating frame.

Figure 2:
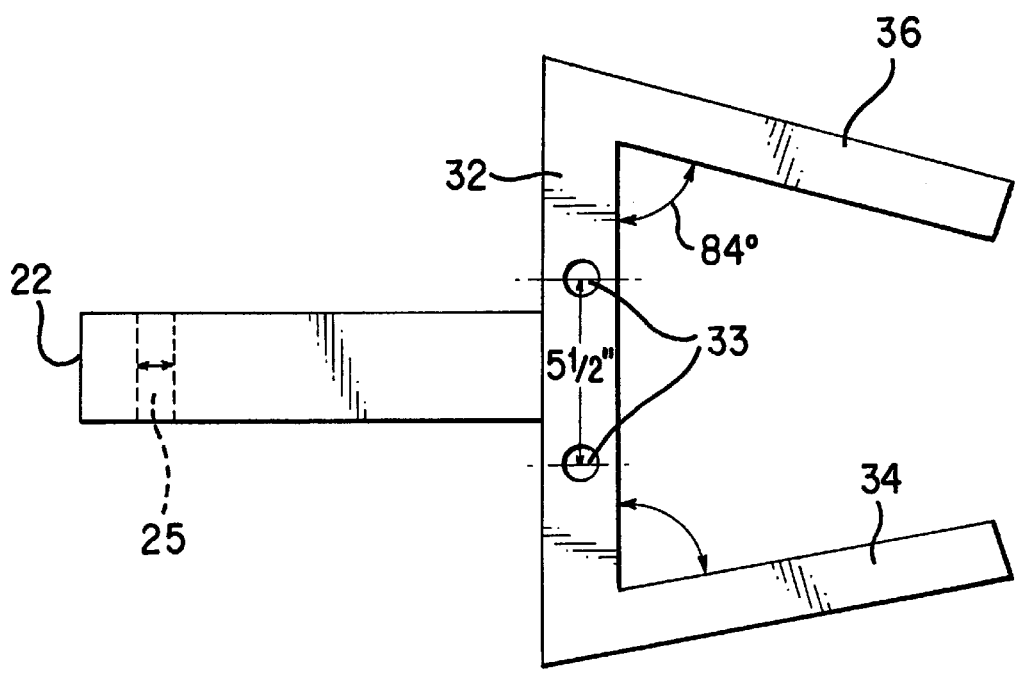
FIG. 2 is a top view of a second embodiment of the frame.

The seating frame consists of a back rail 32. The back rail is preferably 11 inches long and is perpendicular to the extension member. The back rail extends equally on both sides of the extension member. Completing the seating frame are two arms. The arms extend from each end of the back rail. In the embodiment in FIG. 1, the left and right arm 34,36 are perpendicular to the back rail. The top surface of the back rail has a pair of apertures 33. The center of the apertures are spaced 5½ inches from each other and each aperture has a diameter of 0.375 inches. The spacing of the apertures is critical since the distance will allow the aperture to receive the mounting bolts from a standard toilet seat. In this way, the frame could be used with any seat and the seat can be replaced with another standard toilet seat. Referring to FIG. 2, a second embodiment of the frame can be seen. This frame is identical to the first embodiment in all respects, except that the two arms 34,36 create an angle of 84° with the back rail 32.

Figure 3:
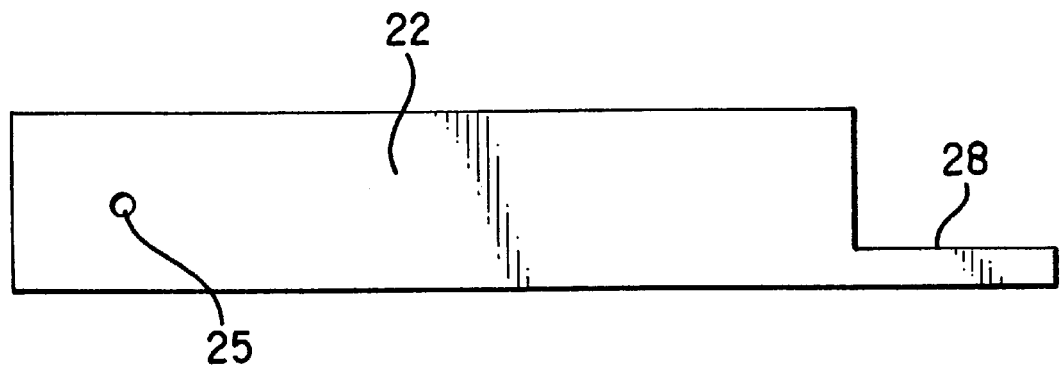
FIG. 3 is a side view of the extension member.

FIG. 3 shows the extension member 22. The extension member is preferably made out of 2 inch by 2 inch tubular steel. Any size tubular steel can be used, however, such as 1¼ and 1⅝. The important feature of the extension member is that it be able to attach to a vehicle trailer hitch. The second end of the extension member is provided with a notch 28. The notch 28 extends 1½ inches from an edge and 1½ inches from the top surface. The function of the notch 28 will be described hereinafter.

Figure 4:
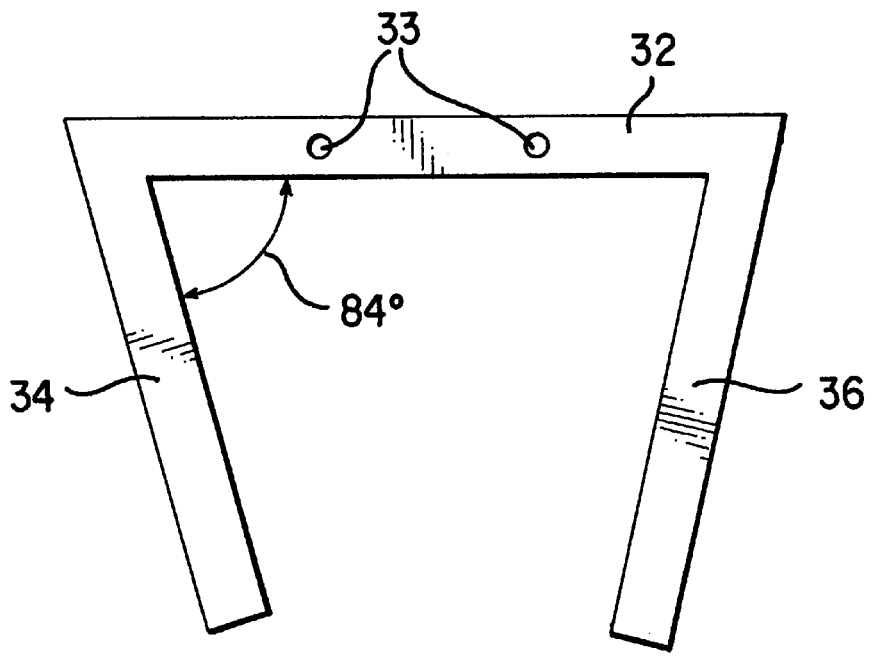
FIG. 4 is a top view of the seating frame.

FIG. 4 shows the seating frame of the second embodiment. The seating frame's back rail and two arms are preferably made of 1½ inch by 1½ inch tubular steel. The back rail 32 is connected to the extension member 22. The 1½ inch by 1½ back rail fits into the notch 28. The notch 28 therefore provides a seat for the back rail and presents a strong welding surface. As can be seen in FIG. 4, the left and right arms 34,36 are creating an angle of 84° with the back rail 32. The apertures 33, besides being spaced 5½ inches from one another are equally spaced from mid point of the top rail top surface.

Figure 5:
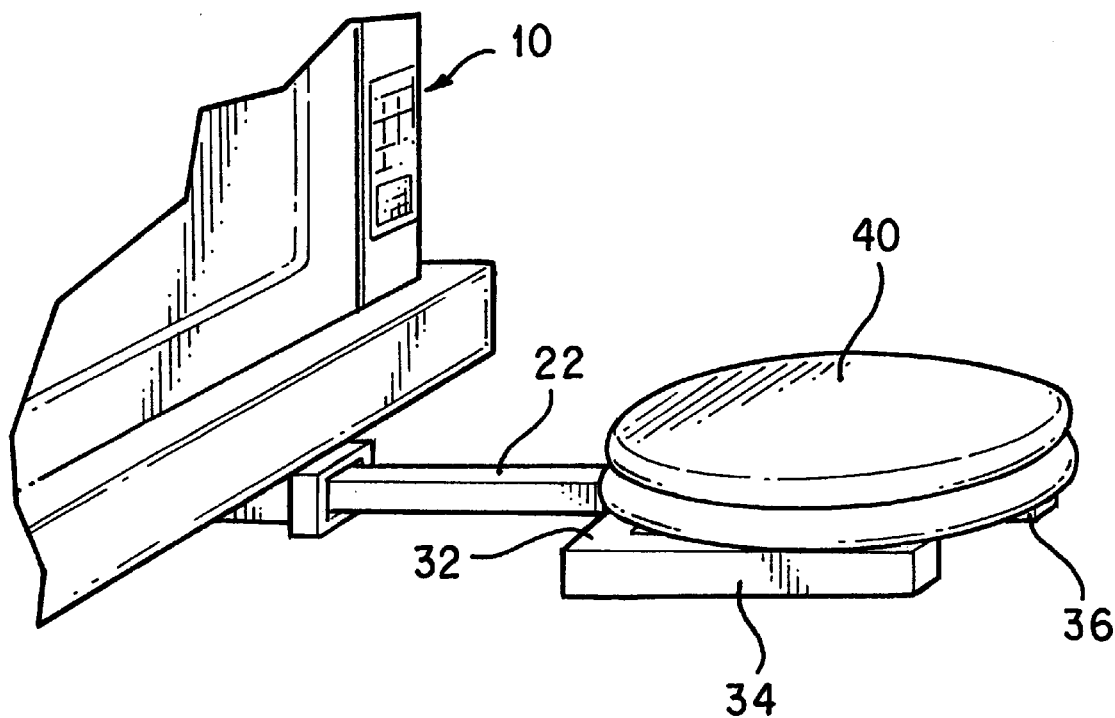
FIG. 5 is a view of the frame attached to a vehicle and supporting toilet seat.

FIG. 5 shows the frame attached to a vehicle and supporting toilet seat 40. The extension member 32 fits within a female trailer hitch. The extension member 32 is secured within the trailer hitch by a pin extending through the aperture 25. As can be seen in this figure, the toilet seat 40 is attached with the mounting bolts along the back rail 32. The left and right arm 34,36 extend underneath the toilet seat to provide support for the end of the toilet seat opposite the mounting bolts.

While the invention has been described with reference to a preferred embodiment, modifications variations would be apparent to one of ordinary skill in the art. The details of the invention described herein are not intended to be limiting.

What is claimed is:

1. A frame for supporting a toilet seat, comprising a horizontal extension member having a first end and a second end,
   - a horizontal back rail connected to the extension member second end, the back rail having a first and second end, the back rail connected to the extension member at a point between the back rail's first and second end,
   - the back rail having mounting apertures,
   - said mounting apertures being approximately five and one half inches part,
   - a left arm extending from the back rail first end,
   - a right arm extending from the back rail second end,
   - the extension member is a 2 inch square tube,
   - the back rail is a 1.5 inch square tube,
   - the extension member second end having a 1.5 inch notch, and
   - the back rail seated in the notch.

2. The frame according to claim 1, further comprising means for attaching the frame to a trailer hitch at the extension member first end.

3. The frame according to claim 1, wherein the left and right arms are perpendicular to the back rail.

4. The frame according to claim 1, wherein the left and right arms are at an 84 degree angle to the back rail.

5. A vehicle mounted toilet seat, comprising:
   - an extension member for attachment to a vehicle mounted trailer hitch, said extension member having a top surface,
   - a seating frame comprises a back rail attached to the extension member, said seating frame having a top surface, said extension member top surface being substantially coplanar with said seating frame top surface,
   - a toilet seat mounted to the seating frame's top surface,
   - the extension member is a 2 inch square tube,
   - the back rail is a 1.5 inch square tube,
   - the extension member second end having a 1.5 inch notch, and
   - the back rail seated in the notch.

6. The vehicle mounted toilet seat of claim 5, wherein the seating frame comprises left and right arms extending from the back rail.

7. The frame according to claim 6, wherein the left and right arms are perpendicular to the back rail.

8. The frame according to claim 6, wherein the left and right arms are at an 84 degree angle to the back rail.

9. The vehicle mounted toilet seat of claim 5, wherein:
   - the toilet seat has two mounting bolts,
   - the seating frame has two apertures, and the bolts engage the apertures to secure the toilet seat to the seating frame.

10. The vehicle mounted toilet seat of claim 5, further comprising an aperture at a first end of the extension member.

* * * * *